Sept. 23, 1952 — E. J. STROHM — 2,611,617
FISHING GAME
Filed July 26, 1948
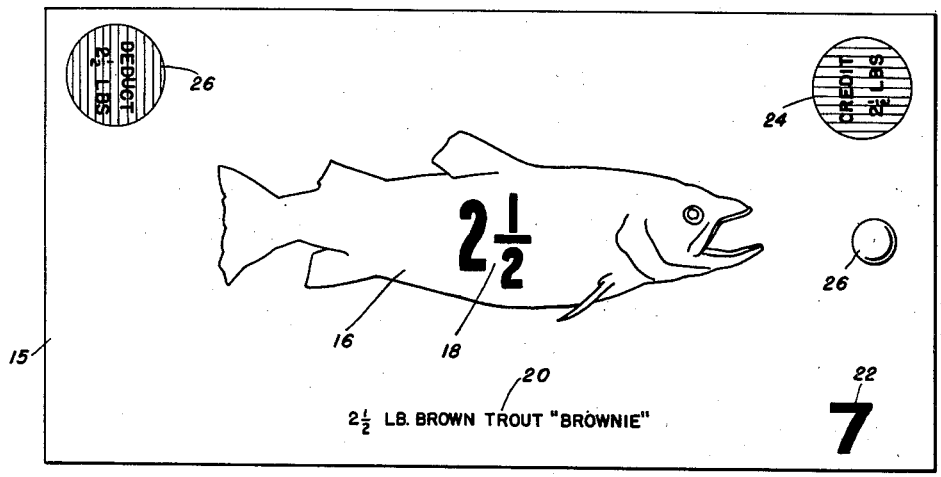
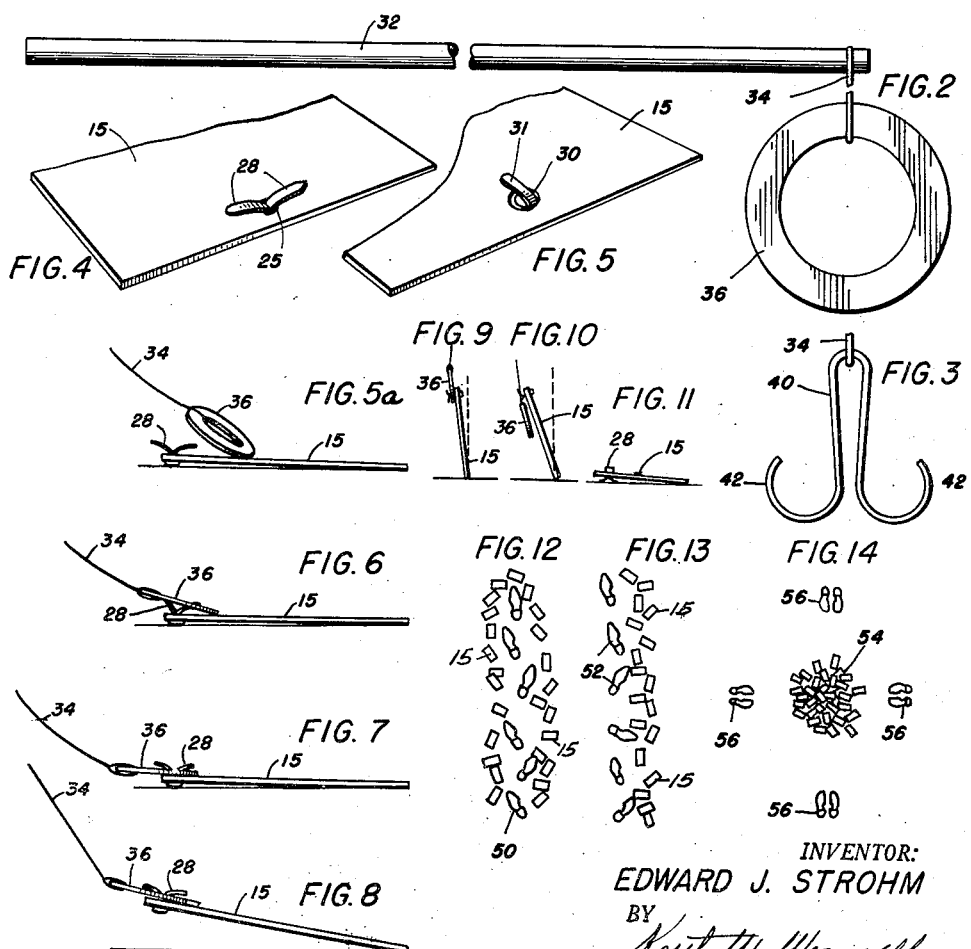
INVENTOR:
EDWARD J. STROHM
BY
ATT'Y Patented Sept. 23, 1952

2,611,617

UNITED STATES PATENT OFFICE 2,611,617

FISHING GAME

Edward J. Strohm, Chicago, Ill.

Application July 26, 1948, Serial No. 40,769

4 Claims. (Cl. 273—140)

This invention relates in general to a fishing game and is more particularly described as a game in which cards are used as the fish, the fish being provided with a projection or projections adapted to be engaged by a hook in the form of a ring or of a double loop carried by a line at the end of a pole and operated substantially in the ordinary manner of catching and landing fish.

An important object of the invention is to provide a new and improved fishing game in which a great variety of set-ups and playing methods are possible using the same parts but playing the game in different ways.

A further object of the invention is to provide a novel catching, landing, and discharging means to simulate the corresponding actions of real fishing.

A further object of the invention is to provide new and improved hooking by means of a simple catch which may be applied to a card for engagement by a special formed hook which is substituted for the barbed hook ordinarily employed.

Still another object of the invention is to provide new and improved means for playing a fishing game which will give information about various kinds of fish showing their appearances and distinguishing characteristics, and the different cards representing the fish containing information of obstacles, disappointments, pleasures, and possibilities of actually fishing for various types of fish.

Other objects of the invention will appear in the specification and will be apparent from the accompanying drawing in which, Fig. 1 is a face view of one of a pack of cards as employed in connection with the game;

Fig. 2 is an elevational view of a fishing pole and tackle as employed in the game;

Fig. 3 shows a modified form of engaging hook;

Fig. 4 is a fragmentary perspective showing a pronged fastener projecting from one of the fish cards;

Fig. 5 is a fragmentary perspective view of a modified form of prong fastener;

Figs. 5a, 6, 7, and 8 are consecutive views illustrating the method of hooking a fish in accordance with this invention;

Figs. 9, 10 and 11 illustrate the method of landing a fish and disposing it with the face of the card in upright position; and Figs. 12, 13 and 14 illustrate different patterns of distribution of the fish for playing the game in different manners.

In the ordinary fishing game, it is customary to provide an open hole or a loop in connection with some article which corresponds to the fish and to provide a pole with a line and a hook thereon to engage in the loop. This is so simple that it loses its attractiveness as a game; it does not simulate fishing or landing operations, and after a brief trial, the interest and attraction of the game is gone.

The present invention overcomes these objections by providing a novel form of fastener in connection with the fish which is not easily engaged by the hook but requires some skill not only in engaging the fish, but in holding it upon the line and in disengaging the hook from the fish in landing it in a particular manner. A further advantage of this game is that it is designed and intended to be played in a variety of ways by any number of people at the same time depending upon the number of fishing outfits in connection with the set.

Referring now more particularly to the drawings, a set or pack of cards is provided, as many as fifty or more, each card 15 being substantially rectangular, containing a picture 16 or representation of a particular kind of fish such as a trout with numerals 18 thereon representing the approximate weight and a designation 20 below the fish stating the species, kind, size, or any other desired distinguishing characteristics. At one corner of the card is an ordinal number 22 designating the particular card of a pack or set, at one corner is a credit designation 24 and at another corner is a debit designation 26, these credit and debit designations preferably being of colors blue and red respectively so that they are easily distinguished from each other.

At one end of each card is a perforation 25 through which a pronged fastener 26 is inserted from the face of the card so that the prongs 28 may be spread oppositely from the back or rear of the card. Instead of this type of fastener, a hollow rivet 30 as shown in Fig. 5 may be applied to the card at the location of the hole 25 having only a single prong 1.

The fishing tackle provided for engaging the fasteners comprises a pole 32 preferably of flexible material such as wood, fiber, and the like having a fish line 34 attached at its outer end and a hook in the form of a continuous ring 36 attached to the other end of the line. Instead of a continuous ring, a double hook 40 may be attached to the fish line having opposite partially closed loops 42 formed of a single piece of wire or similar material.

In playing this game, the cards are disposed face downward upon any suitable surface such as a floor, table, in a box top or any suitable supporting surface. The cards are spread apart but may be partially overlapping if desired so that at least some of the prongs are accessible, and all of the prongs of the separate cards may be made accessible, if desired. In order to engage a card by means of the fishing tackle, the ring 36 may be partially inclined as shown in Fig. 5a so that as drawn over the projecting prongs, one of them will be engaged with the inside opening of the hook or ring as shown in Fig. 6, the ring being further engaged by dropping it flatly with respect to the card and then preferably moving the ring so that the inner edge partially engages both of the prongs, thereby hooking the fish more firmly so that it may be raised and withdrawn from the pool as shown in Fig. 8.

Another feature of the game may be in disengaging the hook or ring from the fish and discharging the card in a face-up position which is accomplished by first supporting the card by the edge opposite the fastening as shown in Fig. 9 and then disengaging the hook therefrom by lowering the line as represented in Fig. 10 allowing the card to drop flatly with the prongs at the under side as shown in Fig. 11.

If the double hook 40 is used, the same fishing technique is employed as with the ring 36 except that either of the projections 42 may be moved to embrace the prongs of the fastener 26 or 30.

With this construction, the complete novel and different game is produced which is capable of many variations of play. A few of these variations are represented as in Fig. 12 where a number of the cards are spread on the floor in a somewhat open pattern so that a fisherman represented by footprints 50 may walk among or between the cards or fish, catching the separate fish as rapidly as possible by the method described. The cards may be scattered in a single line as shown in Fig. 13 with the fishermen represented by footprints 52 at one side thereof for catching the different fish; or the fish may be disposed in the central pile 54 as shown in Fig. 14 and the fishermen may be seated or stand about the pile at spaced intervals as indicated by the foot prints 56 for catching fish from the pile 54.

Many other variations or layout patterns may be employed depending upon the number of players and the method of play. One idea is to catch as many fish as possible in a certain time or to end the game when one fisherman has caught a certain number of fish.

A credit and penalty system may be employed for scoring the game, each card having thereon the weight of the fish which may be either a debit or credit depending upon the designations 24 or 26 which appears on each card.

Not all of the cards are necessarily for fish. Some of them may be for penalties, hazards or special designation in playing the different games. In a complete game for catching bass and brook trout principally, most of the cards will designate a trout or bass of a certain number of pounds credit and the same number of pounds debit or penalty if the fish is engaged by the hook but is not successfully landed. In other words, that fish got away. Other cards are for penalties only such, for example, as a submerged limb, weeds or moss, turtle, a sunfish, even for a sunken boot.

Some games may contain a card for a deputy game warden which would impose one penalty; a game warden card which might impose a more drastic penalty. Another one would be for a one pound trout only which must be thrown back and is therefore a penalty and even a "loss of tackle" card might be included where a large number are playing, this penalty eliminating that fisherman from the contest.

Various other provisions and conditions may be imposed in the way of rules for playing the game in any particular manner and for scoring the player as directed by the cards or in accordance with some other method of registering the debits and credits to each fisherman.

While preferred constructions, arrangements and methods of play have been described in some detail, they should be regarded as an example or illustration rather than a restriction or limitation, as various changes may be made in the construction, combination and arrangement of the parts without departing from the spirit and scope of the invention.

I claim:

1. A fishing game, comprising a flat card bearing a representation of a fish and having a fastener extending through the card at one end and providing oppositely extending substantially flat prongs raised slightly at the extremities from the card and a fishing tackle comprising a pole and a line and a circular hook at the end of the line adapted to be moved over and into engagement under both of the prongs for raising the fish in the operation of catching it, and the hook being disengageable from the prongs by supporting the fish upon the end opposite the prongs in substantially upright position, and lowering the pole and line to disengage the hook from the prongs.

2. A fishing game, comprising a flat card bearing a representation of a fish and having a fastener at one end of the card with prongs oppositely extending from one face but raised slightly at the extremities from the card, a fish pole and a line depending therefrom, a hook at the end of the line having an inner circular portion to engage below the prongs for raising the fish, and the hook being disengageable from the fish by supporting the fish by means of the hook, line and pole in an upright position on the end opposite the fastener, the hook being disengaged from the prongs by lowering the hook slightly and allowing the fish to fall flatly with the side opposite the prongs in upright position.

3. A fishing game, comprising a flat card having a representation of a fish upon one side thereof and distinguishing debit and credit marks on the same face of the card, a fastener at one end of the card having flat prongs extending oppositely and projecting from the rear face of the card, and hook and line means comprising a ring for engaging the flat prongs to catch a fish by engaging under the prongs when the front face of the card is disposed downwardly upon its supporting surface, the credit mark designating a plus value in the game if the fish is landed successfully and the debit mark designating a minus value if the fish is not landed successfully.

4. A fishing game, comprising a flat card having a representation of a fish and having a fastener at one end of the card with prongs extending oppositely from one side of the card and bent in substantially flat condition but raised slightly at the extremities from the card, and a fishing tackle comprising a circular hook adapted to engage under the prongs for raising and withdrawing the card.

EDWARD J. STROHM.

REFERENCES CITED

The following references are of record in the file of this patent:

UNITED STATES PATENTS

| Number | Name | Date |
|---|---|---|
| 1,162,637 | Moad | Nov. 30, 1915 |
| 1,509,873 | Ordway | Sept. 30, 1924 |
| 1,594,164 | Foster | July 27, 1926 |
| 1,910,863 | Sullivan | May 23, 1933 |

FOREIGN PATENTS

| Number | Country | Date |
|---|---|---|
| 399,442 | Great Britain | Oct. 5, 1933 |